(12) United States Patent  (10) Patent No.: US 7,979,894 B2
Royyuru et al.  (45) Date of Patent:  Jul. 12, 2011

(54) ELECTRONIC VERIFICATION SERVICE SYSTEMS AND METHODS

(75) Inventors: Vijay K. Royyuru, Norristown, PA (US); Craig Conway, Bryn Mawr, PA (US); Jean M. Sindaco, Havertown, PA (US); Robert A. Freisheim, Jr., Media, PA (US); Daniel J. Ruppe, Longwood, FL (US)

(73) Assignee: First Data Corporation, Greenwood Village, CO (US)

( * ) Notice: Subject to any disclaimer, the term of this patent is extended or adjusted under 35 U.S.C. 154(b) by 809 days.

(21) Appl. No.: 11/971,060

(22) Filed: Jan. 8, 2008

(65) Prior Publication Data

US 2009/0178120 A1  Jul. 9, 2009

(51) Int. Cl.
*H04L 9/32* (2006.01)
(52) U.S. Cl. .................................... 726/2; 726/3; 726/4
(58) Field of Classification Search .................. 726/1–6; 713/168–170, 182–183; 705/50, 62–70, 705/72, 74–79
See application file for complete search history.

(56) References Cited

U.S. PATENT DOCUMENTS

| | | | |
|---|---|---|---|
| 3,935,361 A | 1/1976 | Dorfman et al. | |
| 5,297,026 A | 3/1994 | Hoffman | |
| 5,649,118 A | 7/1997 | Carlisle et al. | |
| 5,744,787 A | 4/1998 | Teicher | |
| 5,764,789 A | 6/1998 | Pare et al. | |
| 5,774,525 A | 6/1998 | Kanevsky et al. | |
| 5,787,404 A | 7/1998 | Fernandez-Holmann | |
| 5,805,719 A | 9/1998 | Pare et al. | |
| 5,839,117 A | 11/1998 | Cameron et al. | |
| 5,864,830 A | 1/1999 | Armetta et al. | |
| 5,930,764 A | 7/1999 | Melchione et al. | |
| 5,991,736 A | 11/1999 | Ferguson et al. | |
| 6,070,153 A | 5/2000 | Simpson | |

(Continued)

FOREIGN PATENT DOCUMENTS

WO  WO 00/65500  11/2000

OTHER PUBLICATIONS

Wikipedia, "ISO 8583 Standard for Financial Transaction Card Originated Messages—Interchange Message Specifications," found online at http://en.wikipedia.org/wiki/ISO_8583 dated Nov. 27, 2007, 10 pages.

(Continued)

*Primary Examiner* — Hosuk Song
(74) *Attorney, Agent, or Firm* — Kilpatrick Townsend & Stockton LLP

(57) ABSTRACT

Systems and methods for authenticating an applicant. In one implementation, the applicant indicates to an acquirer an existing account for which the applicant wishes to be authenticated. The acquirer sends a message over an electronic funds transfer (EFT) network to an issuer of the account requesting a set of questions to ask the applicant. The issuer replies with a set of questions. The acquirer asks the applicant the questions, and forwards the applicant's answers to the issuer. The issuer compares the answers with known information relating to the account and decides, based on the comparison, whether the applicant is authenticated. The issuer then communicates its decision to the acquirer. Preferably, the messages and their associated replies are added to the set of messages handled by the EFT network, so that authentication may be handled in a standardized way without proliferating applicants' secret information.

26 Claims, 12 Drawing Sheets

U.S. PATENT DOCUMENTS

| | | |
|---|---|---|
| 6,076,075 A | 6/2000 | Teicher |
| 6,138,239 A | 10/2000 | Veil |
| 6,163,604 A | 12/2000 | Baulier et al. |
| 6,185,545 B1 | 2/2001 | Resnick et al. |
| 6,263,447 B1 | 7/2001 | French et al. |
| 6,289,324 B1 | 9/2001 | Kawan |
| 6,298,336 B1 | 10/2001 | Davis et al. |
| 6,330,978 B1 | 12/2001 | Molano et al. |
| 6,430,305 B1 | 8/2002 | Decker |
| 6,580,440 B1 | 6/2003 | Wagner et al. |
| 6,598,024 B1 | 7/2003 | Walker et al. |
| 6,631,849 B2 | 10/2003 | Blossom |
| 6,678,664 B1 | 1/2004 | Ganesan |
| 6,685,088 B1 | 2/2004 | Royer et al. |
| 6,910,020 B2 | 6/2005 | Oyama et al. |
| 6,941,279 B1 | 9/2005 | Sullivan |
| 7,050,996 B1 | 5/2006 | Holm-Blagg |
| 7,058,817 B1 | 6/2006 | Ellmore |
| 7,379,916 B1 | 5/2008 | Mizrah |
| 7,430,537 B2 | 9/2008 | Templeton et al. |
| 2003/0009382 A1 | 1/2003 | D'Arbeloff et al. |
| 2003/0061093 A1 | 3/2003 | Todd |
| 2003/0140004 A1 | 7/2003 | O'Leary et al. |
| 2003/0154406 A1 | 8/2003 | Honarvar et al. |
| 2003/0204457 A1 | 10/2003 | Arias |
| 2004/0138989 A1 | 7/2004 | O'Malley |
| 2004/0260607 A1 | 12/2004 | Robbins et al. |
| 2005/0080692 A1 | 4/2005 | Padam et al. |
| 2005/0097320 A1* | 5/2005 | Golan et al. .................. 713/166 |
| 2005/0246278 A1 | 11/2005 | Gerber et al. |
| 2007/0192618 A1 | 8/2007 | Ellmore |
| 2008/0059364 A1 | 3/2008 | Tidwell et al. |

OTHER PUBLICATIONS

PCT International Search Report and Written Opinion mailed Apr. 17, 2009; International Application No. PCT/US09/30208, 13 pages.

* cited by examiner

Mobile Balance Query Service Applicant Enrollment

Thank you for your interest in the Mobile Balance Query Service. In order to enroll you in the service, we need some information from you. Please fill in the blanks below for the account you wish to enroll:

Name: Amy Applicant
Address: XXX 16th St.
Denver, CO 20202
Phone: (303) 555-5555
Email: amy@bigmail.com ☐ Credit Account  ☐ Visa  ☐ MC  ☐ Discover
Account Number: [ ]

☒ Debit Account
Account number: [ 987654321 0987654321 ]

(For a debit account, please include the bank routing number and the account number. This information is at the bottom of a check as indicated below.)

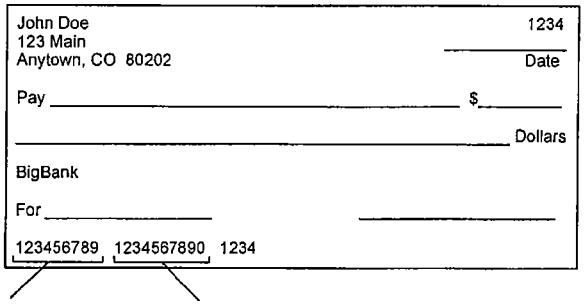

Routing Number    Account Number

[Continue with Enrollment]

```
Message Number: Q1000
Message type:   Question request
Account to authenticate: Debit 987654321 0987654321
```
400

FIG. 4

```
Message Number:  QR1001
Message type:   Reply to question request Q1000

3 questions to ask:
1. What was the name of your first pet?
2. What are the last 4 digits of your social security
number?
3. What was the amount of the largest deposit made to
this account within the past month?
```

Applicant Authentication

In order to enroll you and this account in the Mobile Balance Query service we need to verify your account ownership. We do this by asking you for information that only you as the rightful account holder should know.

Please answer the following questions:

1. What was the name of your first pet?    [Fluffy]

2. What are the last 4 digits of your social security number?    [9999]

3. What was the amount of the largest deposit made to this account within the past month?    [$ 854.63]

[Continue with Enrollment]

```
Message Number: A1002
Message type:   Applicant's answers to QR1001

1. Fluffy
2. 9999
3. 854.63
```
700

FIG. 7

```
Message Number: AR1003
Message type:   Reply to answer message A1002

Applicant SUCCESSFULLY AUTHENTICATED
```
800

Applicant Authentication Successful

Congratulations! Your account ownership has been verified.

| Finalize Enrollment | Cancel |

```
Message Number: AR1003
Message type:   Reply to answer message A1002

Applicant AUTHENTICATION FAILED
```

Applicant Authentication Failed

We're sorry, but we are unable to verify your account ownership, and must decline your application at this time. We apologize for any inconvenience. Please call 1-800-555-5555 for more information.

Close

Applicant Authentication

In order to enroll you and this account in the Mobile Balance Query service we need to verify your account ownership. We do this by asking you for information that only you as the rightful account holder should know.

What is your date of birth? Please choose one:

☐ April 12, 1986    ☐ February 13, 1984

☐ May 15, 1985    ☐ June 22, 1986

[ Continue with Enrollment ]

```
Message Number:  QR1001
Message type:  Reply to question request Q1000

4 questions to ask:
1. First pet name, format single text
2. Last 4 digits SSN, format single number
3. Amount of largest deposit in the past month, format
     single dollar value
4. Birth date, format multiple choice date, 4
     answer choices, 12-APR-1986, 13-FEB-1984,
     15-MAY-1985, 22-JUN-1986
```

1400

FIG. 14 ns and Methods

BACKGROUND OF THE INVENTION

Authentication of a holder of a financial account is typically performed by an issuer of the account at the time the account is opened. The authentication of the account holder for delivery of a subsequent service often relies on secret information shared between the account holder and the issuer.

A service provider other than the issuer may wish to offer to the account holder a service that involves access to the account. For example, the service provider may wish to provide a service that allows the account holder to check the account balance via mobile commerce, or may wish to provide a service that allows the account holder to make payments from the account for purchases made over the Internet. In order to reduce the likelihood of fraud, the service provider needs to authenticate an applicant for its service as the rightful holder of the account, but the service provider may not have access to the secret information shared between the account holder and the account issuer.

Previous methods of authenticating an applicant by a provider other than the issuer have required the service provider to learn some of the secret information from the issuer, thereby undesirably proliferating the account holder's secret information.

BRIEF SUMMARY OF THE INVENTION

In one implementation that includes several embodiments of the invention, an applicant indicates to an acquirer an existing account for which the applicant wishes to be authenticated. The acquirer sends a message over an electronic funds transfer (EFT) network to an issuer of the account requesting a set of questions to ask the applicant. The issuer replies with a set of questions. The questions test the applicant's knowledge of various information relating to the account that only the rightful account holder (who was previously authenticated) is likely to know. The acquirer asks the applicant the questions, and forwards the applicant's answers to the issuer. The issuer compares the answers with known information relating to the account and decides, based on the comparison, whether the applicant is authenticated as the account holder. The issuer then communicates its decision to the acquirer. Preferably, the messages and their associated replies are added to the set of messages handled by the EFT network. In this way, authentication may be performed in a standardized way without proliferating applicants' secret information.

In accordance with one example embodiment of the invention, from the point of view of an acquirer, a method of authenticating an applicant comprises receiving an indication of an existing account purportedly owned by the applicant. A question request message is transmitted, requesting one or more questions relating to the account to be asked to the applicant. A first reply is received in response to the question request message and comprises a set of the one or more questions. The applicant is asked the questions, and answers are received from the applicant. The applicant's answers are sent to an issuer of the account in an answer message. A reply is received from the issuer in response to the answer message, indicating whether the applicant is authenticated. The messages and replies are carried over an electronic funds transfer network. In some embodiments, the first reply is supplied by an operator of the electronic funds transfer network. In some embodiments, the first reply is supplied by the issuer. In some embodiments, at least one of the questions is reformatted before being presented to the applicant. In some embodiments, interaction with the applicant is accomplished through a series of web pages served over the Internet. In some embodiments, interaction with the applicant is accomplished via telephone or at least in part via wireless communication. In some embodiments, the method is performed by an acquirer, and the acquirer does not learn the content of the answer message. In some embodiments, the content of the answer message is encrypted before it is sent over the electronic funds transfer network. In some embodiments, the method is performed by an acquirer and the applicant is an applicant for enrollment in a service offered by the acquirer.

In accordance with another embodiment of the invention, from the point of view of an issuer, a method for authenticating an applicant comprises receiving a question request message identifying an existing account. The question request message requests a set of one or more question relating to the account to be asked of the applicant. A reply is transmitted in response to the question request message. The reply comprises the set of one or more questions. An answer message is received comprising answers given by the applicant to the set of questions. The answers are compared with known information relating to the account, and a decision is made based on the comparison whether the applicant is authenticated as the account owner. A reply is transmitted in response to the answer message, indicating whether the applicant is authenticated. The messages and replies are carried over an electronic funds transfer network. In some embodiments, the questions are selected from a list of standard questions defined by an operator of the electronic funds transfer network. In some embodiments, the issuer of the account supplies a list of challenge questions in advance to an operator of the electronic funds transfer network, which then supplies the first reply comprising one or more questions from the list. In some embodiments, at least one of the questions tests the applicant's knowledge of secret information previously shared between the issuer and the holder of the account. In some embodiments, at least one of the questions tests the applicant's knowledge of the transaction history of the account, and may test the applicant's knowledge of one or more patterns or anomalies in the transaction history. In some embodiments, at least one of the questions tests the applicant's knowledge of a card associated with the account. In some embodiments, at least one of the questions is formed so that the correct answer to the question changes over time. In some embodiments, at least one of the questions tests the applicant's knowledge of an object or piece of information provided by the issuer to the account holder for the purpose of later authentication. In some embodiments, at least one of the questions is a multiple choice question. In some embodiments, the first reply comprises guidance for formatting the questions when they are presented to the applicant. In some embodiments, it is decided that the applicant is authenticated as the account holder when the applicant provides a first predetermined number of correct answers to a second predetermined number of questions.

In accordance with another example embodiment of the invention a system for authenticating an applicant comprises a host computer executing a program stored on a computer readable medium, and the host computer is configured to receive an indication of an account purportedly owned by the applicant; transmit a question request message identifying the account and requesting a set of one or more questions about the account to be asked to the applicant; receive a reply in response to the question request message comprising the set of one or more questions; ask the applicant the questions; receive answers to the questions from the applicant; transmit an answer message to an issuer of the account comprising the applicant's answers; and receive a second reply from the issuer in response to the answer message indicating whether the applicant is authenticated as the owner of the account. The messages and replies are carried over an electronic funds transfer network. In some embodiments, interaction with the applicant is accomplished via a series of web pages served over the Internet.

In accordance with another example embodiment of the invention a system for authenticating an applicant comprises a host computer executing a program stored on a computer readable medium, and the host computer is configured to receive a question request message identifying an account and requesting one or more questions relating to the account to be asked of the applicant; transmit a response to the question request message a first reply comprising the one or more questions; receive an answer message comprising a set of answers given by the applicant to the questions; compare the answers with known information relating to the account; decide, based on the comparison, whether the applicant is authenticated as the account owner; and transmit, a second reply in response to the answer message, the second reply indicating whether the applicant is authenticated. The messages and replies are carried over an electronic funds transfer network.

In accordance with an other example embodiment of the invention, a method comprises adding to a set of messages handled by an electronic funds transfer network two messages and their associated replies. The first message requests a set of questions to be asked of an applicant for authentication. The reply to the first message comprises a set of questions to ask the applicant. The second message communicates the applicant's answers to a recipient of the second message. The reply to the second message communicates an indication of whether the applicant is authenticated. In some embodiments, the messages carry the questions and answers in existing data elements in a message format based at least in part on the ISO 8583 standard.

BRIEF DESCRIPTION OF THE DRAWINGS

FIG. 3 shows a user interface window in accordance with an example embodiment of the invention.

FIG. 4 shows some content of a question request message, in accordance with an example embodiment of the invention.

FIG. 5 shows some content in a reply to the question request message of FIG. 4, in accordance with an example embodiment of the invention.

FIG. 6 shows a user interface window in accordance with an example embodiment of the invention.

FIG. 7 shows some content of an answer message, in accordance with an example embodiment of the invention.

FIG. 8 shows a reply to the answer message of FIG. 7, in accordance with an example embodiment of the invention.

FIG. 9 shown a user interface window in accordance with an example embodiment of the invention.

FIG. 10 shows a reply to the answer message of FIG. 7, in accordance with an example embodiment of the invention.

FIG. 11 shows a user interface window in accordance with an example embodiment of the invention.

FIG. 13 shows a user interface window in accordance with an example embodiment of the invention.

FIG. 14 shows some example content of a reply to a question request message in accordance with an example embodiment of the invention.

DETAILED DESCRIPTION OF THE INVENTION

The present invention relates to systems and methods for authentication of an applicant. For the purposes of this disclosure, authenticating an applicant means gaining persuasive confidence that the applicant is a person with the right to perform the act applied for, such as enrolling in a service. An "applicant" is any person being authenticated by the methods described and claimed herein, whether the person is applying for enrollment in a service or is being authenticated for some other reason.

For the purposes of this disclosure, an indication that a particular process or function is performed by a particular entity includes performance of the process or function by a processing entity authorized by the entity. For example, any action attributed in this disclosure to an issuer may be performed by a processing entity authorized by the issuer, and the action is still considered to be performed by the issuer for the purposes of this disclosure. Similarly, an acquirer may authorize or contract a processing entity to perform some of the actions attributed to the acquirer, and the action is still considered to be performed by the acquirer for the purposes of this disclosure.

Figure 1:
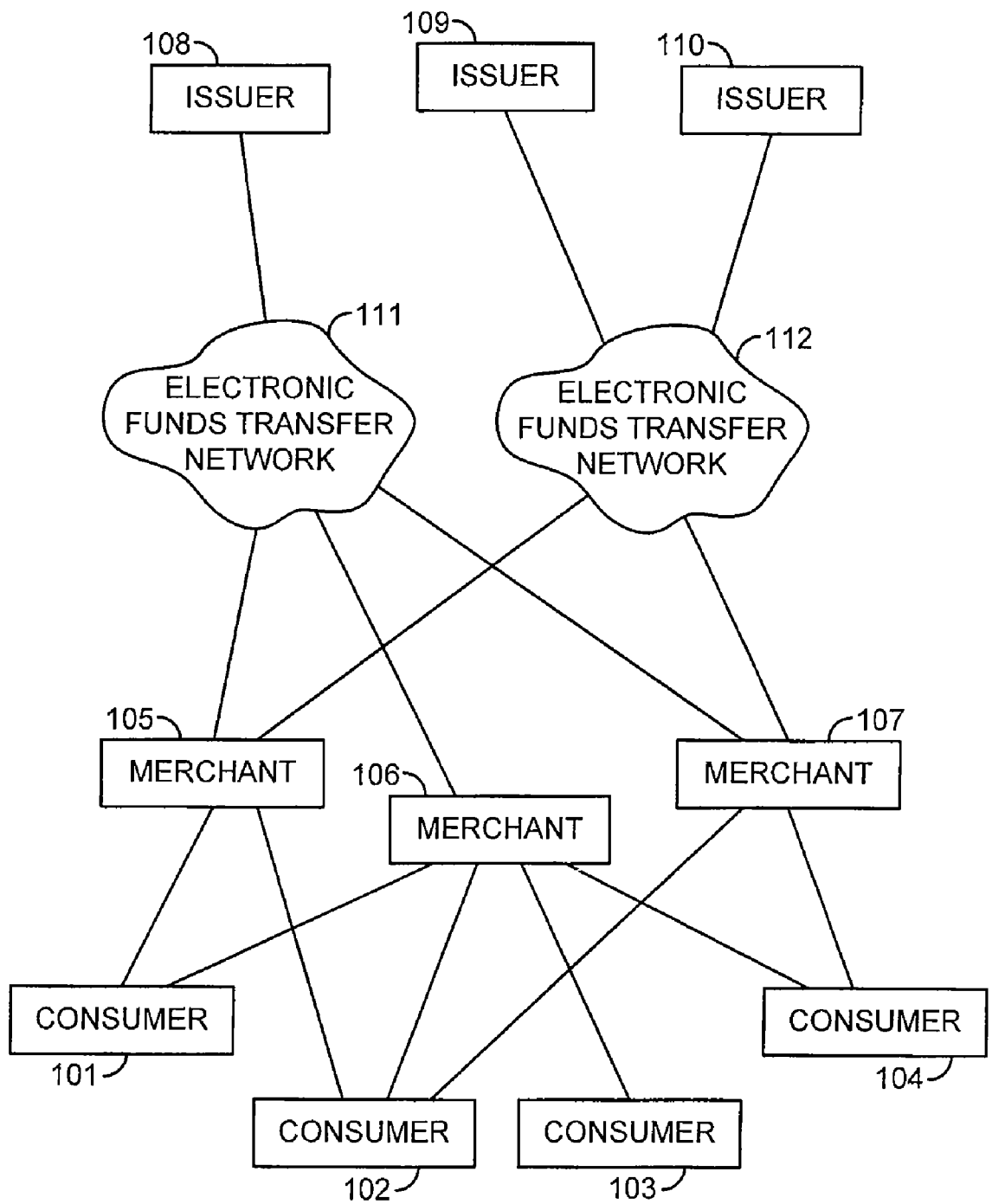
FIG. 1 illustrates a retail payment system for conducting purchase transactions and effecting payment for them using credit cards, debit cards, or other kinds of payment instruments.

FIG. 1 illustrates a retail payment system for conducting purchase transactions and effecting payment for them using credit cards, debit cards, or other kinds of payment instruments. In the diagram of FIG. 1, a number of consumers 101-104 make purchases at a number of merchants 105-107. Each consumer makes payment using a payment instrument issued by one of issuers 108-110.

Each consumer has a pre-existing relationship with the issuer of the payment instrument being used. The issuer is typically a bank. The bank may extend credit to the consumer, against which the consumer makes purchases with a credit card. In this case, the consumer periodically pays the bank for the purchases, often with funds drawn on a different bank (not shown). Or the bank may hold funds in a debit account and the consumer may make purchases using funds in the account using a debit card.

In a typical credit card transaction, the consumer presents the card to the merchant at a point of sale. The merchant reads account information from the card, often by "swiping" the card through a point of sale (POS) terminal. The POS terminal transmits the account information in a "purchase message"

along with details about the transaction through one of electronic funds transfer (EFT) networks 111 or 112 to the issuer of the card (or a processing company hired by the issuer) for transaction approval. The transaction details included in the purchase message include at least the amount of the proposed transaction, and may include other information. Usually, the issuer verifies that the consumer has sufficient credit to make the purchase, and transmits the approval back through the payments network to the merchant. (If the consumer does not have sufficient credit, the transaction may be denied.) For most credit card transactions, the consumer is asked to sign a document at the time of purchase, as a way of authenticating the consumer as the rightful account holder and not someone attempting to make a fraudulent purchase.

A typical debit card transaction proceeds a way similar to a credit card transaction. Often for debit cards, authentication of the consumer is done by way of a personal identification number (PIN) entered by the consumer, rather than using a signature.

More detail about payments networks and payment transactions may be found in pending U.S. patent application Ser. No. 11/055,028 of Rogers et al. and entitled "Methods and systems of processing transactions", the entire disclosure of which is incorporated by reference herein.

A merchant accepting a credit or debit card for a purchase may sometimes be referred to as an "acquirer", as the merchant acquires the card or other purchasing credentials from the consumer. Other entities may also be referred to as acquirers. For example, when a consumer presents his or her debit card to an automated teller machine (ATM), the ATM, or the owner of it, is the acquirer. When the consumer indicates that he or she wishes to make a withdrawal, the ATM sends a "withdrawal message" over a financial transaction network, such as EFT networks 111 and 112, to the issuer of the card account. The withdrawal message includes an identification of the account from which funds are to be taken, an amount to withdraw, and may include other information as well. Usually, the issuer verifies that the consumer has sufficient funds in the account, and sends an approving message to the ATM. If there are not sufficient funds in the account, the transaction may be denied.

A deposit made at an ATM follows a similar course, with the ATM sending a "deposit message" to the issuer of the account to which funds are to be added. When a consumer returns a previous purchase to a merchant for a refund, the merchant may send a "return message" indicating an amount of the refund and an account, held by the consumer, to which the refund should be credited. The complete set of messages that may be sent over a particular financial transaction network is described in the network's Technical Reference Manuals. On example of such a manual is the STAR ISO 8583 Message Format Guide.

Electronic funds transfer (EFT) networks such as networks 111 and 112 route the communications between acquirers and issuers based on account information supplied by the consumer. An EFT network is an infrastructure that supports the exchange of data in implementing financial transactions. The diagram of FIG. 1 is greatly simplified. In actuality there are roughly dozens of EFT networks, hundreds to thousands of issuers, thousands to millions of acquirers, and hundreds of millions of consumers. Without these networks, each merchant would need a relationship with each issuer whose instruments the merchant wished to accept, and the task of managing transaction approvals would be very burdensome for the merchants. Using EFT networks, each merchant need only have a relationship with one or at most a few networks. Not all issuers use all networks, and not all merchants accept cards serviced by all networks. Well-known EFT networks in operation today include Visa®, MasterCard®, and others used mainly in credit card transactions, and NYCE®, Star®, and others used mainly in debit transactions.

When a new credit card is issued to a consumer, the consumer is typically authenticated. That is, the issuer takes some steps to gain confidence that the applicant for the card is really the person he or she purports to be, and that the issued card will be used only by the rightful owner of the new account. For example, in one authentication scheme, when a new credit card is issued, the consumer provides some confidential information, such as the consumer's address, phone number, social security number or other government identification number, or other information. The new card is mailed to the consumer's home, and the consumer is required to call the issuer from the consumer's home phone number to "activate" the card. The consumer also signs the card. These steps help ensure that the signature on the back of a credit card is that of the rightful account holder, as the rightful account holder is the only person likely to be able to receive the card at the consumer's home address and use the consumer's home phone to activate the card. The consumer's signature can then be compared at a point of sale with the signature on the card as a way of verifying that the consumer is also the rightful holder of the card account. This kind of authentication relies on secret information shared between the consumer and the issuer.

Similarly, a PIN is typically set up for a debit card at the time the debit card is issued, using similar security measures.

With the advent of electronic commerce, other complications arise. For example, when a consumer purchases by phone or online, the merchant has no way to verify a signature on a credit card because the consumer is not present in person at the merchant location. Such transactions carry more risk for the merchant than in-person transactions. Some merchants may decline to make certain sales rather than accept the risk.

One solution to the problem of authentication of purchasers in an Internet transaction is for the payments network to offer a verification service for cards or other payment instruments. In this arrangement, the rightful user of a particular card chooses a password that must be supplied whenever the card is used in a transaction where the card is not physically present. The password is known to the payments network or to a processor audited and approved by the payments network, which then requires the password to be given when a transaction is attempted. When the correct password is given during a transaction, all parties have increased confidence that the purchaser is the rightful cardholder, assuming that the rightful person chose the password to start with. In light of this confidence, the payments network shifts the risk of any fraudulent transactions from the merchant to the issuer. Merchants are free to accept verified cards by phone or Internet without worry, and consumers and issuers are confident that if a card is lost of stolen, the card will not be used to make fraudulent purchases because the finder or thief will not know the password.

The success of a card verification service relies on the fact that the rightful cardholder is the one who chose the password. During a consumer's initial enrollment in the card verification service, it is therefore necessary to authenticate the cardholder applying for enrollment. Previously, this was done using secret information in cooperation with the issuer of the card. That is, the payments network administrator requested some secret information from the issuer about a particular cardholder, and then required that a cardholder attempting to register a particular card in the service supply the same secret information before enrollment could be completed. The secret information may include the cardholder's home telephone number, part of the consumer's social security number, or other similar information. This method has the disadvantage that it undesirably spreads the consumer's secret information to the payments network or other processors, who previously had no need of it.

Electronic commerce also presents new opportunities. For example, systems are being developed for mobile commerce. In a mobile commerce system, a consumer may carry a "digital wallet", which stores credit card information and various other purchasing credentials on a portable electronic device such as a cellular telephone. If a particular card issuer has implemented systems compatible with mobile commerce, consumers may be able make purchases, query their account balances or available credit, make payments, and perform other financial tasks conveniently with one mobile device. A payments network or other service provider may wish to provide services that enable mobile commerce, even though some card issuers may not implement systems compatible with mobile commerce. For example, a payments network may accept a mobile commerce account balance query from a consumer, send a query through traditional channels to the card issuer, receive the requested information from the card issuer through traditional channels, and then pass the information to the consumer via mobile commerce. More detail about various systems and methods for conducting mobile commerce may be found in co-pending U.S. patent application Ser. No. 11/830,459 of Arthur et al. and entitled "Payments using a mobile commerce device", the entire disclosure of which is incorporated by reference herein.

The credit card verification service and the mobile commerce services described above are examples of services that require knowledge of or access to an account held by a user of the service. During the enrollment of an applicant in such a service, the service provider (which may be the network administrator as in the examples above) is an acquirer. The service provider acquires a set of account credentials and is faced with the problem of authenticating the applicant as the rightful account holder. Other similar situations may also be envisioned where an acquirer who is not the issuer of an already-existing account needs to authenticate an applicant as the rightful account holder. For example, an internet payment service may enable a consumer to specify an account from which payments are to be made for online purchases. The provider of the internet payment service needs to authenticate applicants for the service. Many providers do not possess any secret information about applicants, and therefore cannot complete the authentication without some assistance.

As is described above, authenticating an applicant by a service provider has traditionally required the cooperation of the issuers. Because there are many card issuers, each of which may have different requirements for data interchange, the task of setting up the new service may be formidable. In some prior systems, authentication of an applicant by an entity other than an issuer undesirably spreads the applicants secret information.

Figure 2:
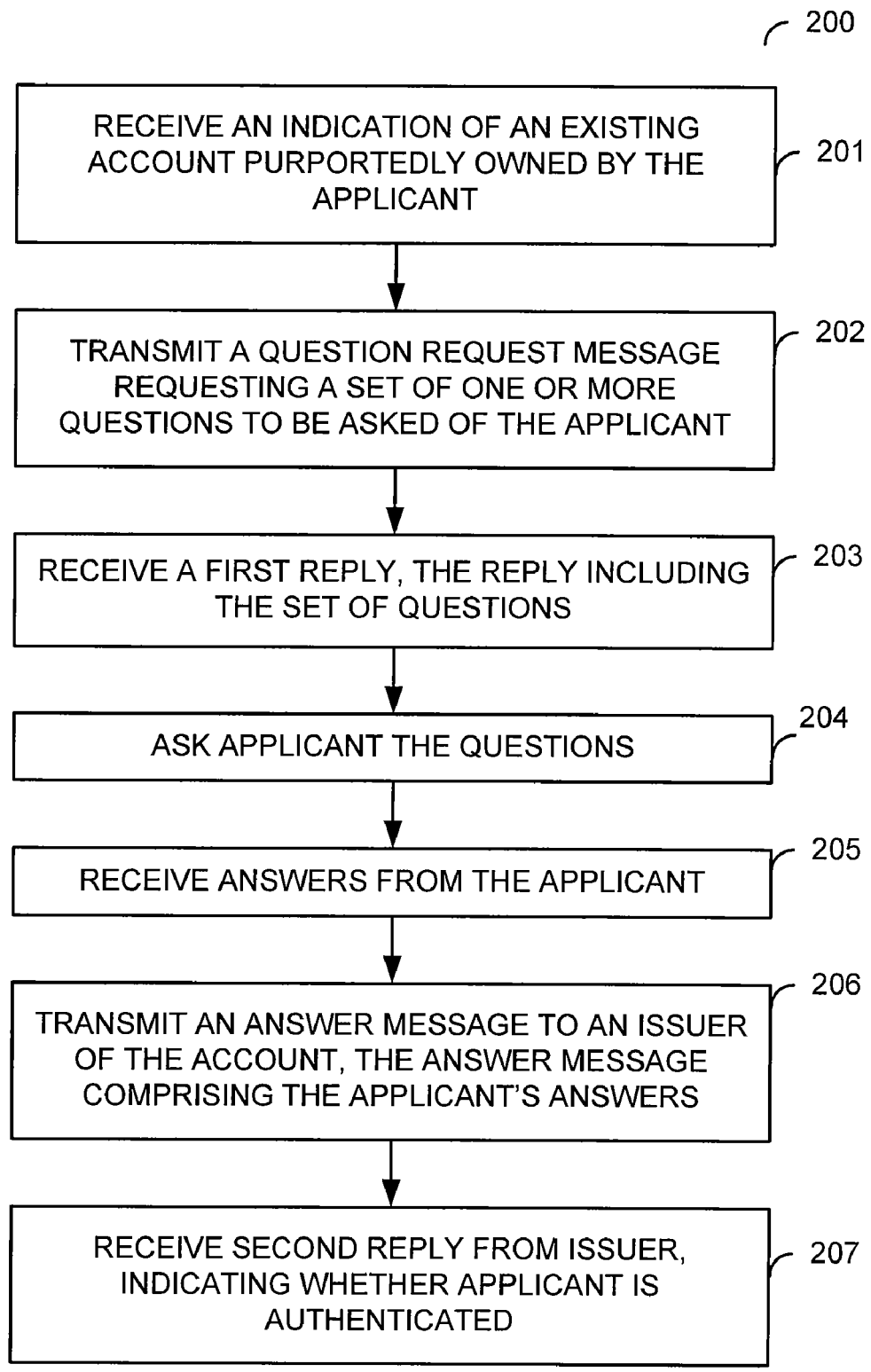
FIG. 2 shows a flowchart of a method for authenticating an applicant, in accordance with an example embodiment of the invention.

FIG. 2 shows a flowchart of a method 200 for authenticating an applicant, in accordance with an example embodiment of the invention. The method of FIG. 2 is presented from the point of view of a service provider who receives from an applicant a request for enrollment in a service that requires access to an account purportedly held by the applicant. Because the applicant provides an account number or other account identifier as part of the application process, the service provider may also be thought of as an acquirer. Once an indication of an account is received from an applicant, the authentication is accomplished using a set of messages passed between an acquiring service provider and an issuer over an EFT network.

In step 201, the service provider receives from an applicant an indication of an existing account. For a service enrollment, this is the account that is to be accessed as part of providing the service. For example, if the service being applied for is a credit card verification service, the applicant may provide the credit card number of the credit card that is to be enrolled. If the service is a mobile commerce balance query service, the applicant may provide the number of a debit account that the service will access to provide account balances.

An application for enrollment may be received in any of a number of ways. For many services, an applicant may apply via the Internet, using a set of web pages served by a host computer operated by or for the service provider. Alternatively, an applicant may apply for enrollment by telephone, for example using a touch-tone or interactive voice response (IVR) interface, or by other means. FIG. 3 shows an example user interface window 300 that may be used by an applicant applying over the Internet for enrollment in a mobile balance query service for querying the balance in a bank checking account. Once the applicant has entered the requested information, he or she may click the "Continue with Enrollment" 302 to proceed.

In step 202, the service provider transmits a question request message over an EFT network to the issuer of the account. An example of content 400 comprised in a question request message is shown in FIG. 4. Of course, the format of the messages shown in FIG. 4 and other figures is only exemplary and chosen for clarity of explanation. Actual messages need not be in any human-readable format or contain any explanatory or extraneous information, and may simply be strings of binary digits, with certain codes, bit patterns, or fields understood to have certain meanings. The messages may conform with an industry standard format, for example the format described in the STAR ISO 8583 Message Format Guide or another similar document. Preferably, this and other messages used in the method are encrypted at the point of transmission and decrypted only by the issuer, so that any intermediate entities handling the transmission, including the EFT network, do not know the content of the messages. This encryption technique may be similar to existing techniques used to encrypt personal identification numbers (PINs) entered at ATMs, preventing the EFT network from learning the PINs.

In step 203, the service provider or acquirer receives a first reply in response to the question request message. The reply includes a list of questions to ask the applicant, but does not include any indication of the correct answers to the questions. An example of content 500 comprised in a reply to the question request message is shown in FIG. 5. In the example of FIG. 5, three example questions are shown. The first two example questions test the applicant's knowledge of secret information that was previously shared between the account holder and the issuer, for example when the account holder opened the checking account. This is information that the rightful account holder should know, but anyone who is not the rightful account holder is unlikely to know. The third question is of a different type, and tests the applicant's knowledge of details in the account's transaction history. This is also information that the account holder should know or be able to readily find, but that anyone else is unlikely to know. However, this is not secret information that was previously shared in the way that the account holder's first pet's name may have been. The subject matter of the third question differs in another way from that of the first two, as will be explained in more detail later.

In step 204, the service provider or acquirer asks the applicant the questions. In step 205, the service provider or acquirer receives answers to the questions from the applicant. FIG. 6 shows an example user interface window 600 for asking the applicant the questions shown in FIG. 5, and providing a means for receiving the answers from the applicant. Once the applicant has entered answers to the questions, he or she clicks on "Continue with Enrollment" 601 to proceed.

In step 206, the service provider or other acquirer transmits an answer message to an issuer of the account. The answer message comprises the applicant's answers to the questions. An example of content 700 comprised in an answer message is shown in FIG. 7. As with the other messages utilized in the method, this message is preferably encrypted at the point of transmission so that intermediate entities handling the transmission, including the EFT network, do not learn the content of the message. Preferably, even the service provider or acquirer does not learn or store the content of the answer message or other messages. This may be accomplished by any of several methods used individually or in combination. For example, the answer message may be encrypted by the applicant's computer before the answers are passed to the acquirer on their way to the issuer. Also, the acquirer may be forbidden to store the contents of the message by the terms of one or more agreements, for example with the EFT network over which the messages are carried or with one or more issuers.

Once the issuer has the applicant's answers to the questions, the issuer can compare the answers with known information about the account. For example, the issuer can compare the answer to the question "What was your first pet's name?" with the answer the account owner gave to the same question when the account was opened. If the answers match, then confidence is increased that the applicant is also the rightful account holder, who was previously authenticated. Each answer that matches known information about the account increases the confidence. The issuer may decide that the applicant is the account holder and send an "authentication successful" reply if, for example, the applicant provides a predetermined number of correct answers to a predetermined number of questions. For example, if the applicant in the above example answers two of the three questions correctly, the issuer may decide that authentication has been successful (the applicant is the account holder).

Referring again to FIG. 2, in step 207, a second reply is received from the issuer, in response to the answer message. The second reply indicates whether or not the applicant is authenticated. In this example, authentication was successful. FIG. 8 shows an example content 800 of a second reply that may be received from the issuer in the event that authentication is successful. FIG. 9 shows an example user interface window 900 presenting the results of a successful authentication to the applicant. The applicant may finalize enrollment by clicking the "Finalize Enrollment" user interface button 901, or may cancel the enrollment 902.

FIG. 10 shows an example content 1000 of a second reply that may be received from the issuer in the event that authentication fails. FIG. 11 shows an example user interface window 1100 presenting the results of an unsuccessful authentication to the applicant.

Preferably, in order to enable a method in accordance with an embodiment of the invention, two message types and their associated answer messages are added to the set of messages that may be carried by an electronic funds transfer network.

The first of the added messages is called a "question request message" in this disclosure, and an example is shown in FIG. 4. Of course another name may be chosen for a message having characteristics similar to the message shown in FIG. 4. The question request message contains an indication of an account, and requests that the acquirer be sent a set of questions that can be asked of a person wishing to be authenticated as the owner of the account. The message contains enough information about the account that the electronic funds transfer network can route the message to the appropriate issuer. (Error handling routines and messages may also be provided, in the event that an applicant provides an invalid account number, that the authentication process is interrupted, or some other exceptional event occurs.) In the example of FIG. 4, the message contains the routing number of a bank where the account is held, and the account number. In the case of a credit card account, the message may include the card type and the card number. The reply to the question request message comprises a list of questions about the account. The list is prepared by or for the issuer, and the reply is sent to the acquirer. An example of a reply to a question request message is shown in FIG. 5, and includes questions to ask the applicant as part of the authentication process. For the purposes of this disclosure, a question is any challenge designed to test the applicant's knowledge, whether or not formed as an interrogative sentence, and an applicant's answer is the applicant's response to a challenge, whether or not the challenge was formed as an interrogative sentence.

The second of the added messages is called an "answer message" in this disclosure, but of course another name may be used. An example of an answer message is shown in FIG. 7. The answer message is sent from the acquirer to the issuer, and provides the answers that the applicant gave to the questions that were provided in an associated question request message. The reply to an answer message is an indication of whether authentication was successful or not. The reply is sent from the issuer to the acquirer, presumably after the issuer has compared the answers supplied in the answer message with information the issuer knows about the account.

An authentication method embodying the invention has significant advantages over previous techniques. One advantage is that secret information is not proliferated. When encryption, contractual restrictions, and other controls are in place to control access to the information contained in the messages, the EFT network does not learn any secret information, and even the acquirer may be prevented from learning any secret information.

Another advantage is that the authentication process is standardized, or in the language used in the art, the process is "federated". Using the new standard messages, nearly any acquirer can accomplish authentication with nearly any issuer using two simple standardized messages and their associated replies. It is no longer necessary to negotiate or implement different authentication methods and protocols with different issuers. The acquirer collects enough information about an account to enable the EFT network carrying the messages to route the authentication request to the proper account issuer.

Figure 12:
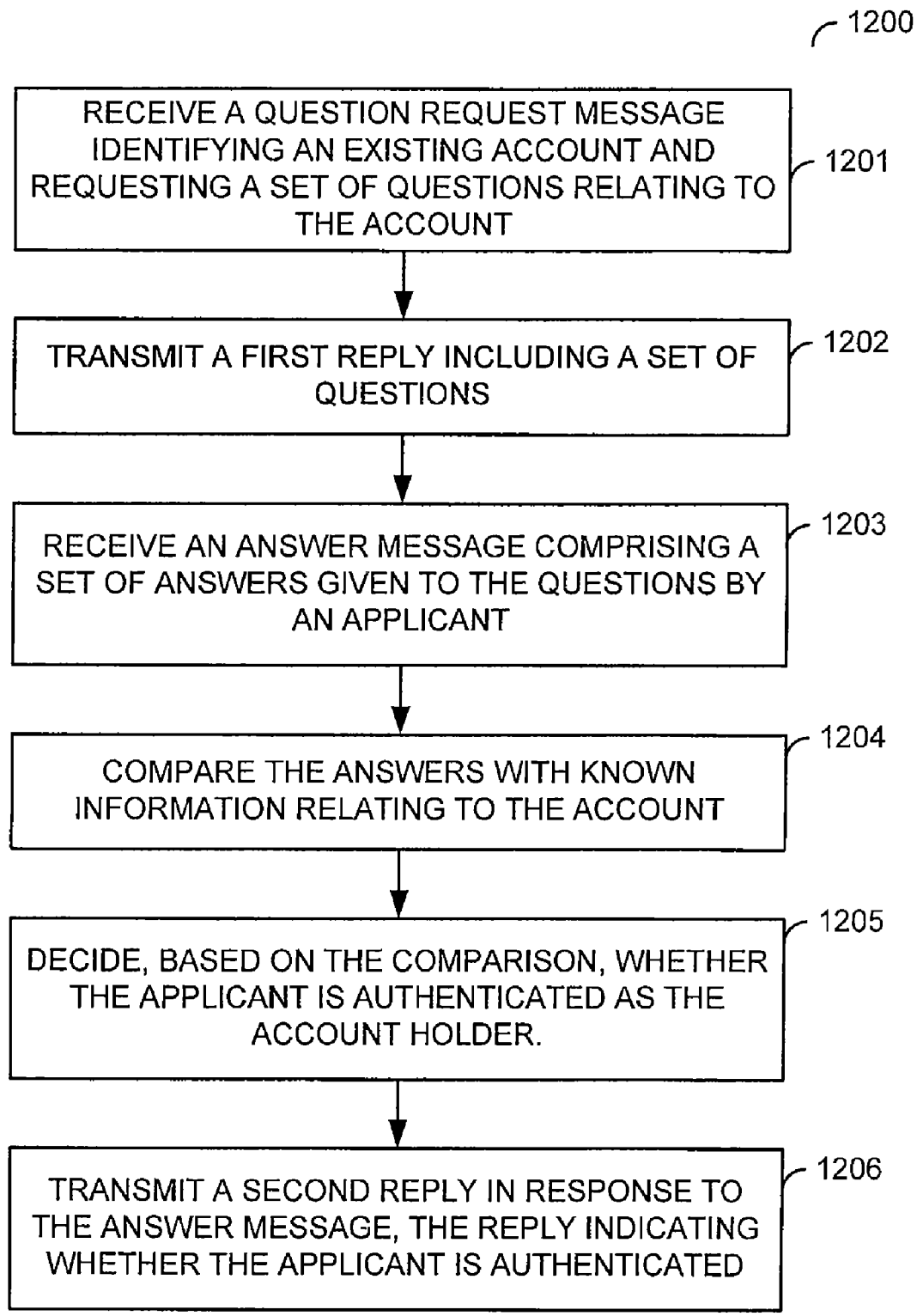
FIG. 12 shows a flowchart of a method in accordance with another example embodiment of the invention.

FIG. 12 shows a flowchart of a method 1200 for authenticating an applicant, in accordance with another example embodiment of the invention. The method of FIG. 12 is presented from the point of view of an issuer of the account for which authentication is sought. The messages described are carried over an EFT network.

In step 1201, a question request message is received. An example of a question request message is shown in FIG. 4. In step 1202, the issuer transmits a first reply to the question request message. The reply comprises a set of questions relating to the existing account identified in the question request message.

The issuer may select the questions in any of a variety of ways. The questions test the applicant's knowledge of details about the account. Questions may test the applicant's knowledge of information provided by the account holder when the account was opened, may test the applicant's knowledge of the account's transaction history, or may test other aspects of the account. Preferably, the issuer knows several items of secret information that the account holder is likely to be able to remember, that are unlikely to change with time, and that a person who is not the account holder will not likely know. For example, when a new account is opened by the issuer, the issuer may require that the account holder supply several pieces of secret personal information. The information may include the account holder's social security number or other government identification number, the account holder's mother's maiden name, the account holder's address, telephone number, electronic mail address, or other items. The account holder may be asked to provide answers to some challenge questions designed to be used for later authentication. For example, the account holder may be asked the name of his or her first pet, his or her favorite food, the name of his or her elementary school, or other similar information. When a question request message is received in accordance with an embodiment of the invention, the issuer may select one or more of these items of secret information to be tested. A question sent in a reply message may ask "What was the name of your first pet?", "What is your favorite food?", or some other similar question. Questions 1 and 2 shown in FIG. 6 test information of this kind. Other items that may be tested by questions of this kind include the account holder's birth date, zip code, telephone number, or other similar information.

While both questions 1 and 2 shown in FIG. 6 test the applicant's knowledge of information that others are unlikely to know and that doesn't change over time, the two questions carry different degrees of risk. If someone other than the account holder learns the name of the account holder's first pet, that information is relatively innocuous. It might possibly be used in a fraudulent authentication attempt, but this is unlikely. On the other hand, a portion of an account holder's social security number is a common challenge item, and is more likely to be used in a fraudulent authentication attempt. Furthermore, if the account holder's entire social security number is learned by someone other than the account holder, the account holder is at increased risk of becoming an victim of identity theft or other crime.

The issuer also knows information about the account that the account holder is likely to know, that anyone who is not the account holder is unlikely to know, and that does change over time. Question 3 shown in FIG. 6 tests this kind of information. Such information may be said to have a short "shelf life". The answer to question 3 changes from month to month, so even if the answer is learned by someone wishing to use it fraudulently, the time period during which the information is useful is limited. The shorter the shelf life of a piece of information, the less risk is carried by a question testing that piece of information.

Other kinds of information may be tested as well. For example, questions may test the applicant's knowledge of information about a card associated with the account. Aspects of a card that may be tested include the expiration date and the card security code or card verification value printed on the card.

Another kind of question may test the applicant's knowledge of an object or piece of information provided by the issuer to the account holder for the purpose of later authentication. For example, an issuer may mail an account holder a token or passcode by postal mail to the account holder's home address. A challenge question can then ask for the token or passcode.

Questions may be formulated in a variety of ways. The questions shown in FIG. 6 were presented such that the correct response to each was entry of the item of information tested. Questions could also be formed as multiple choice or true/false questions. FIG. 13 shows an example of a user interface window 1300 asking a multiple choice question. In this format, the correct answer is an indication of which of the four choices is the correct item of information. Of course, more or fewer than four choices may be presented. Multiple choice questions may be especially suited to authenticating an applicant using a interactive voice system over a telephone, because the correct response to a multiple choice question is an indication of which answer is correct, for example "B" or "2". In answering a multiple choice question by telephone, the applicant needn't speak secret information out loud, and the risk of someone other than the applicant learning secret information about the applicant is reduced.

As is implicit in the above example, the acquirer may be free to reformat the questions before presenting them to the applicant. In the above example, the questions received in the terse style of the message of FIG. 5 were reformatted into a more pleasing user interface format for presentation in the window of FIG. 6. In order to facilitate reformatting and ease of information exchange, the question message may contain guidance for assisting the acquirer in reformatting the questions. For example, the guidance may indicate that the answer to a particular question is expected to be a string of alphabetic characters, or that the answer to another question is expected to be a number representing a dollar value. The guidance may provide all of the answer choices to be presented in a multiple choice question. FIG. 14 shows some example content 1400 of a reply to a question request message. The reply includes formatting guidance in accordance with an example embodiment of the invention.

An issuer may develop various algorithms for selecting questions to supply in response to a question request message. The questions may be tailored to the account type. For example, a question relating to a debit account may test the applicant's knowledge of deposit amounts or times or ATM withdrawal amounts or times. A question relating to a credit card may test the applicant's knowledge of payment amounts, purchasing patterns or the like. The questions may be designed to test the applicant's knowledge of an account's transaction history. Various methods and systems for testing an applicant's knowledge of an account's transaction history, including the applicant's knowledge of one or more patterns or anomalies in the transaction history, are described in co-pending U.S. patent application Ser. No. 11/874,584 of Royyuru and entitled "Service enrollee authentication", filed Oct. 19, 2007, the entire disclosure of which application is incorporated herein by reference for all purposes.

Referring again to FIG. 12, in step 1203, an answer message is received from the acquirer. The answer message includes answers given by the applicant to the questions. In step 1204, the issuer compares the answers with information known by the issuer about the account.

In step 1205, the issuer decides, based on the results of the comparison, whether the applicant is authenticated as the account holder. For example, if all of the applicant's answers match information known to the issuer, the issuer can be confident the applicant is in fact the account holder, and the applicant may be authenticated as the account holder. Or if a predetermined number of the applicant's answers to a predetermined number of questions match, for example if the applicant correctly answers three out of four questions, the applicant may still be authenticated. Deciding whether the applicant is authenticated "based on" the comparison means that the comparison results form at least part of the criteria determining the decision outcome. For example, one particular number of correct answers may result in the applicant being accepted, while another particular number of correct answers may result in the applicant being declined. The decision need not be based exclusively on the comparison. That is, the decision criteria may include other factors in addition to the comparison results while still being based on the comparison.

Besides the examples given above, many other criteria for making a decision based on the comparison are possible. For example, the issuer may insist that the applicant correctly enter the last four digits of the account holder's social security number, and fail any authentication where this question is answered incorrectly, regardless of the number of correct answers to other questions. Or the issuer may require that all of the questions be answered correctly before considering the applicant to be authenticated as the account holder. Or the issuer may accept as correct any answer that is within a predetermined percentage or tolerance range of the correct answer to a question involving an monetary amount. In the above example, the applicant may not have an account statement available from which to determine the exact amount of her largest deposit in the past month, ($854.63), but may remember that the deposit was about $850. In order to accommodate this situation, the issuer may accept the answer of $850.00 as close enough to the exact amount that it is still confident the applicant is the account holder. For example, the issuer may accept an answer that is within 5 percent or within $10 of the correct amount, or may use some other tolerance criteria.

In step 1206, the issuer sends a second reply in response to the answer message. This second reply indicates whether the applicant is authenticated.

Figure 15:
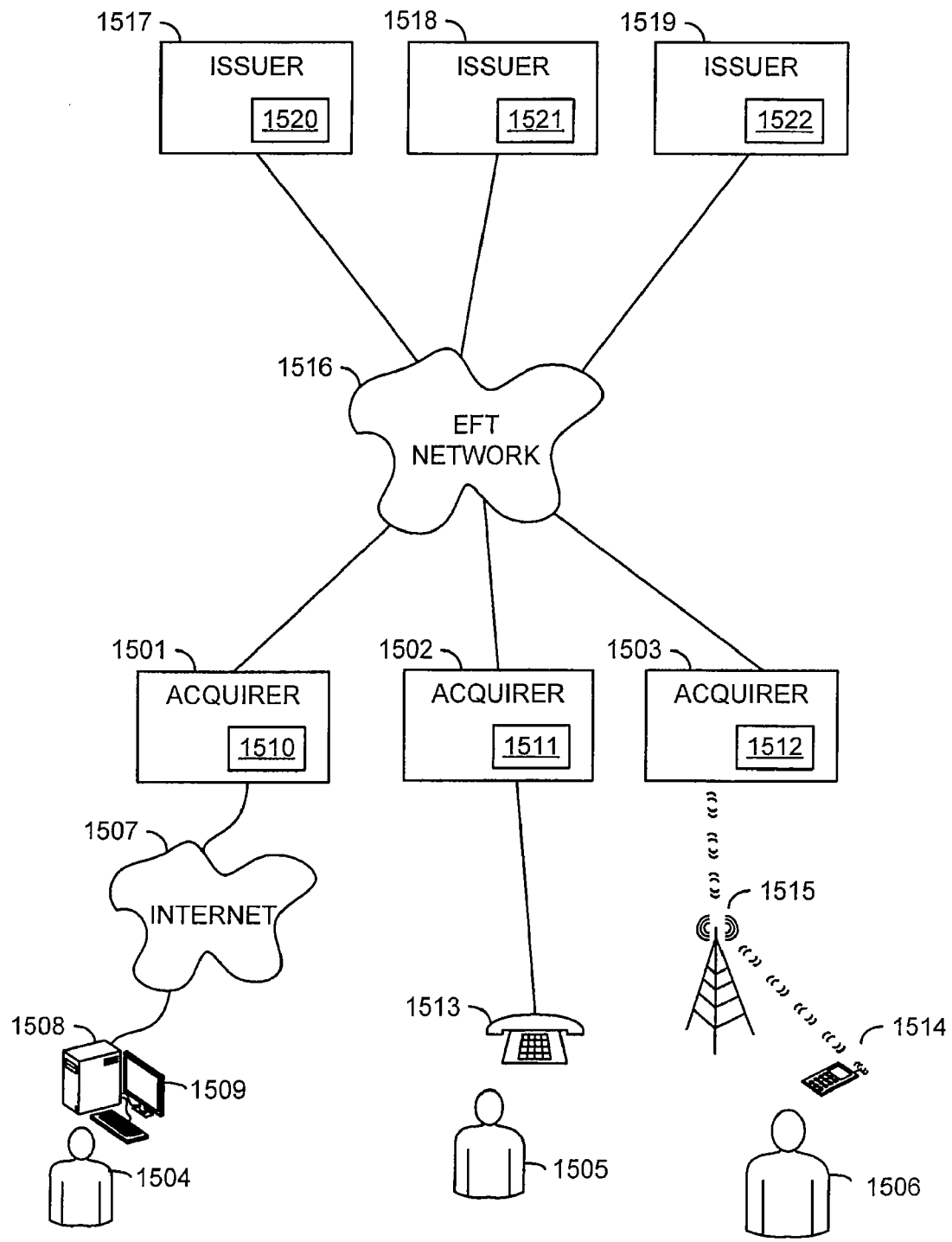
FIG. 15 shows a simplified block diagram of a system in accordance with an example embodiment of the invention, in which embodiments of the invention may be practiced.

FIG. 15 shows a simplified block diagram of a system in accordance with an example embodiment of the invention and in which embodiments of the invention may be practiced. Acquirers 1501, 1502, and 1503 wish to authenticate applicants 1504, 1505, and 1506. For example, the applicants may be applying for enrollment in services offered by the acquirers, or there may be some other reason that authentication is desired. Of course, FIG. 15 is greatly simplified. In practice there may be many more acquirers, issuers, networks, and applicants, and any particular applicant may contact multiple acquirers. Each acquirer 1501, 1502, 1503 may be a service provider wishing to enroll one of applicants 1504, 1505, 1506 in a service, or may wish to authenticate an applicant for some other reason. Applicant 1504 interacts with acquirer 1501 over the Internet 1507, using personal computer 1508. Preferably, a host computer 1510 system operated by acquirer 1501 interacts with applicant 1504 through a series of web pages exemplified by those shown in FIGS. 3, 6, 9, and 11, viewed on screen 1509.

Applicant 1505 interacts with acquirer 1502 via telephone 1513. A host computer 1511 operated by acquirer 1502 may interact with applicant 1505 automatically, for example through a voice response system where a voice synthesized by computer 1511 requests information from applicant 1505, applicant 1505 speaks the information, and voice recognition implemented on computer 1511 recognizes what was spoken by applicant 1505. Alternatively, computer 1511 may request information using a synthesized voice, and applicant 1505 may enter the information using a touch tone keypad on telephone 1513. Or, applicant 1505 may simply speak with a customer service representative at acquirer 1502.

Applicant 1506 interacts with a host computer 1512 at acquirer 1503 through a mobile device 1514, which may be, for example, a cellular telephone that communicates wirelessly over a wireless provider network represented by tower 1515.

Each host computer 1510, 1511, 1512 performs its functions under control of one or more programs stored on computer readable media. Each of computers 1510, 1511, 1512 sends and receives messages and answers over EFT network 1516, which switches the messages and answers between acquirers 1501, 1502, 1503, and issuers 1517, 1518, 1519. Host computers 1520, 1521, 1522 at issuers 1517, 1518, 1519 preferably receive and send messages and answers under the control of one or more programs stored on computer readable media. Computer readable media are well-known, and may include random access memory (RAM), read only memory (ROM), volatile memory, nonvolatile memory, magnetic disk storage, optical storage, tape storage, or any of these and other kinds of computer readable media in any combination.

Each of the host computers shown in FIG. 15 is depicted for ease of explanation as a monolithic block. In practice each host computer may comprise multiple computers, which may be co-located or widely distributed on one or more networks. Similarly, the computer readable media and storage associated with a particular host computer may be comprised in the computer or may be geographically separated from the computer and connected to the computer by one or more interfaces or networks.

While the embodiments so far described involve messages and replies exchanged between an acquirer and an issuer, some parts of the process may be delegated to an operator of the EFT network. For example, an issuer may develop a list of challenge questions that are to be asked, or from which questions are to be selected for asking, of each applicant for authentication. The issuer may supply this list to the operator of the EFT network. When the EFT network recognizes that a question request message is being handled that relates to an account issued by that issuer, the EFT network may simply reply to the message according to instructions provided by the issuer. The reply from the EFT network includes questions selected from the list provided by the issuer. No confidentiality is compromised by this arrangement, as the questions themselves do not carry any secret information.

The operator of the EFT network may be involved in other ways as well. Of course, the EFT network operator may be the entity that develops and implements any new messages and replies used to embody the invention. Also, the EFT network operator may develop a master list of standard challenge questions from which an issuer may select in choosing challenge questions to be asked of an applicant.

Figure 16:
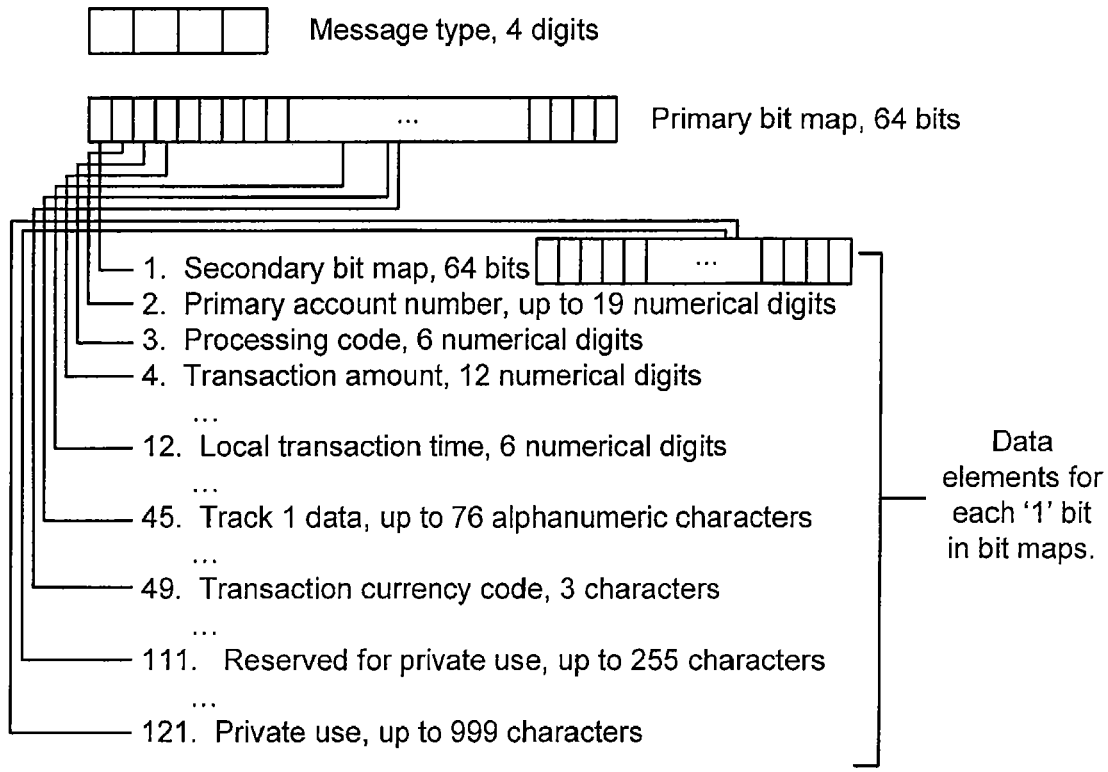
FIG. 16 illustrates the general structure of a message based at least in part on the ISO 8583 standard.

While many different message formats are possible for the request and response messages added to the message set, some implementations may be based on the ISO 8583 standard. This standard broadly defines some message criteria, and many networks base their message formats at least in part on this standard. A message format based at least in part on the standard may structure its messages in the manner shown in FIG. 16, but may depart somewhat from the standard in implementation details. For example, a particular message format may use certain data elements differently than the standard specifies. FIG. 16 illustrates the general structure of a message based at least in part on the ISO 8583 standard. Each message starts with a 4-digit message type and a 64-bit bit map. For each bit position in the bit map holding a '1', a data element follows in the message. The data elements present follow in the order in which their corresponding bits appear in the bit map. Several element formats are available, and each data element is specified to follow one of the available element formats. For example, data elements may be of fixed or variable length, and may contain numerical data, alphabetic data, alphanumeric data, or other items. One of the possible data elements (corresponding to the first bit of the primary bit map) is a secondary bit map, indicating the presence or absence of each of another 64 data elements. Some data elements may be required for certain message types, some may be optional, and some may be conditional. Conditional data elements are required only when certain other data elements are present or have certain values.

Within this broad structure, implementers have considerable flexibility. For example, a system designer may designate four new message types as yet unused by a particular EFT network. The various acquirers, issuers, and others connected to the network would then configure their systems to send, receive, recognize, and act on these messages appropriately.

Figure 17:
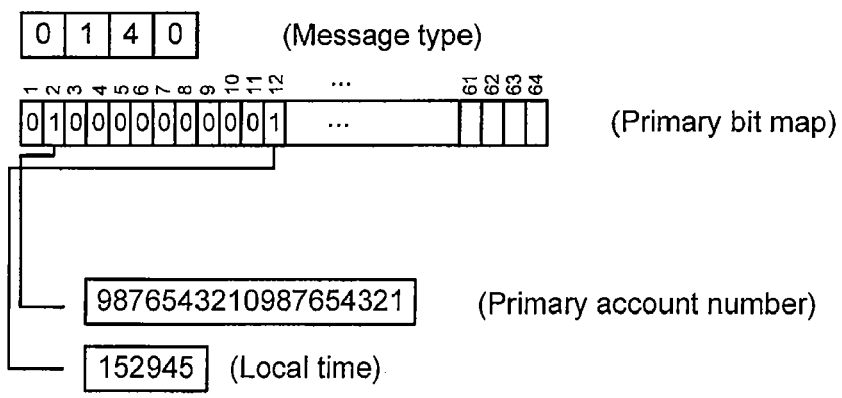
FIG. 17 shows a partial question request message according to an example embodiment of the invention.

In one example embodiment, a designer may designate the four new message types as follows:
 0140 Question request message
 0150 Reply to question request (contains questions to ask applicant)
 0160 Answer message (contains applicant's answers to questions)
 0170 Reply to answer message In this example system, a question request message may then be formatted with message type 0140, and enough account information that the message can be routed to the proper issuer. For example, bit 2 in the primary bit map may be set to a '1', and the account number, for example an account number typed into an enrollment user interface screen such as the one shown in FIG. 3, may be entered into the corresponding data element in the message. Other data elements may also be supplied, such as the local time at which the message was composed, or other information. Because a new command is being defined, the designer has considerable flexibility in deciding which fields to require or use in each message. FIG. 17 shows a partial question request message according to this example embodiment. In FIGS. 17-20, the information in boxes is information actually in the messages, and other information in the figures is explanatory.

Figure 18:
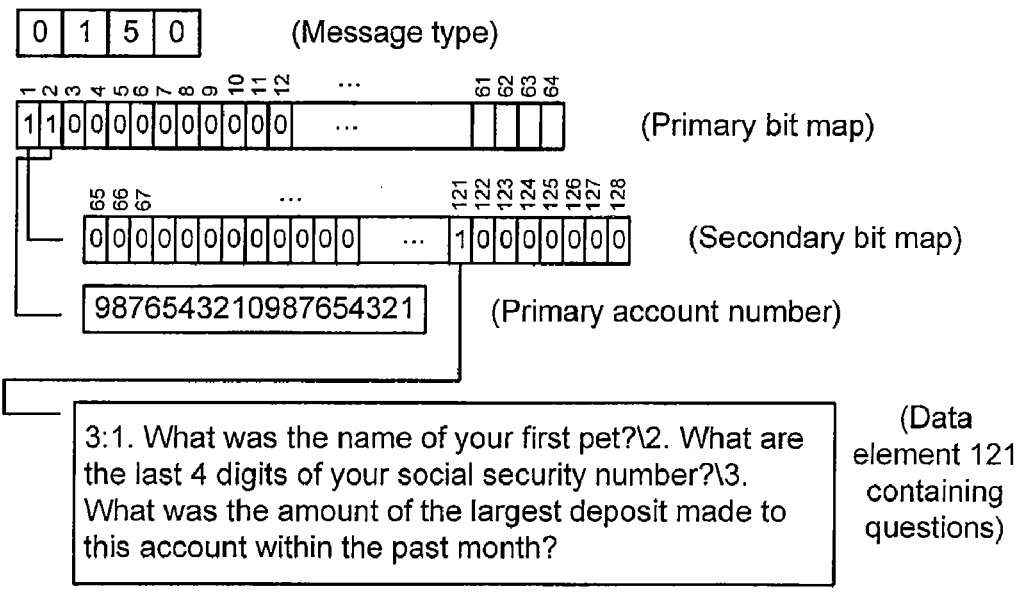
FIG. 18 shows a partial reply to the question request message of FIG. 17, in accordance with an example embodiment of the invention.

A reply to the question request may also use the structure outlined in the ISO 8583 specification. In one example embodiment, a reply to a question request may begin with a message type of 0150. Preferably, the account number found in the question request message is also placed in data element 2 of the reply message. The issuer may place the questions in a data element reserved for private use, for example element 121 in the message format of FIG. 16. Of course, corresponding bit 121 would be set to a '1' in the secondary bit map. FIG. 18 shows a partial reply to the question request message of FIG. 17, according to this example embodiment. In this example, the questions have been delimited with backslash characters, but the designer of the system may choose any appropriate format for transmitting the questions.

Figure 19:
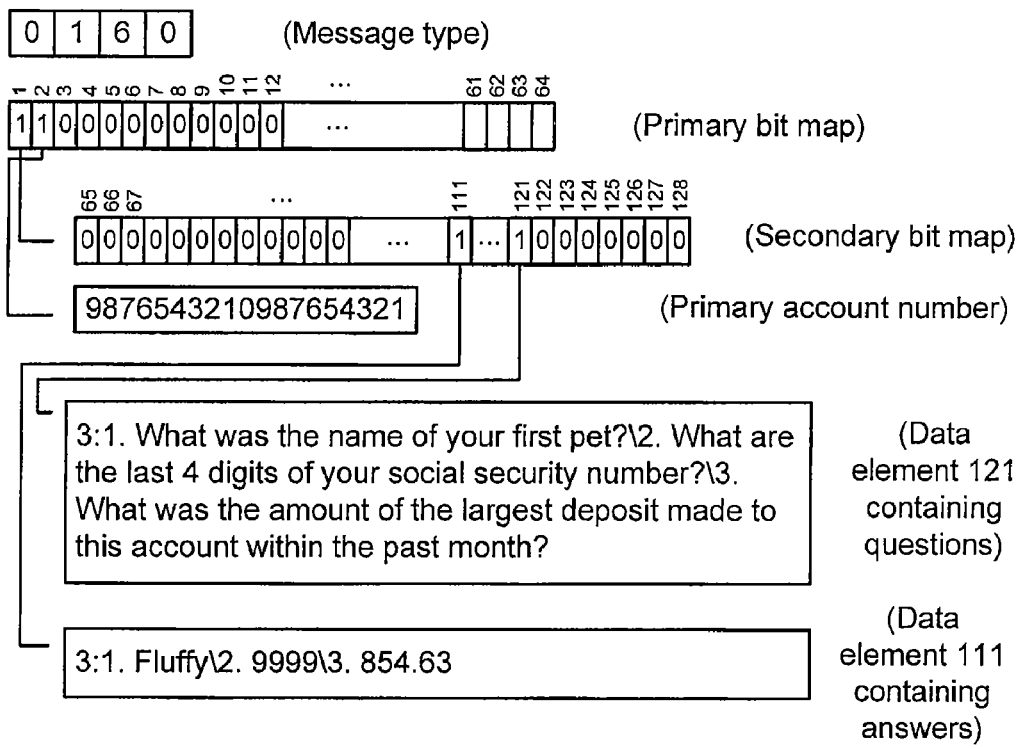
FIG. 19 shows a partial answer message, in accordance with an example embodiment of the invention.

FIG. 19 shows a partial answer message, according to this example embodiment. In this example, the message type is 0160, indicating that this is an answer message. Data element 121 has been left intact so that the questions accompany the answers, and the answers supplied by the applicant, for example using a screen similar to that shown in FIG. 6, have been placed in data element 111. Corresponding bit 111 in the secondary bit map has been set to a '1'. For ease of explanation, the answers are shown in FIG. 19 as unencrypted, but of course, any suitable encryption may be used.

Figure 20:
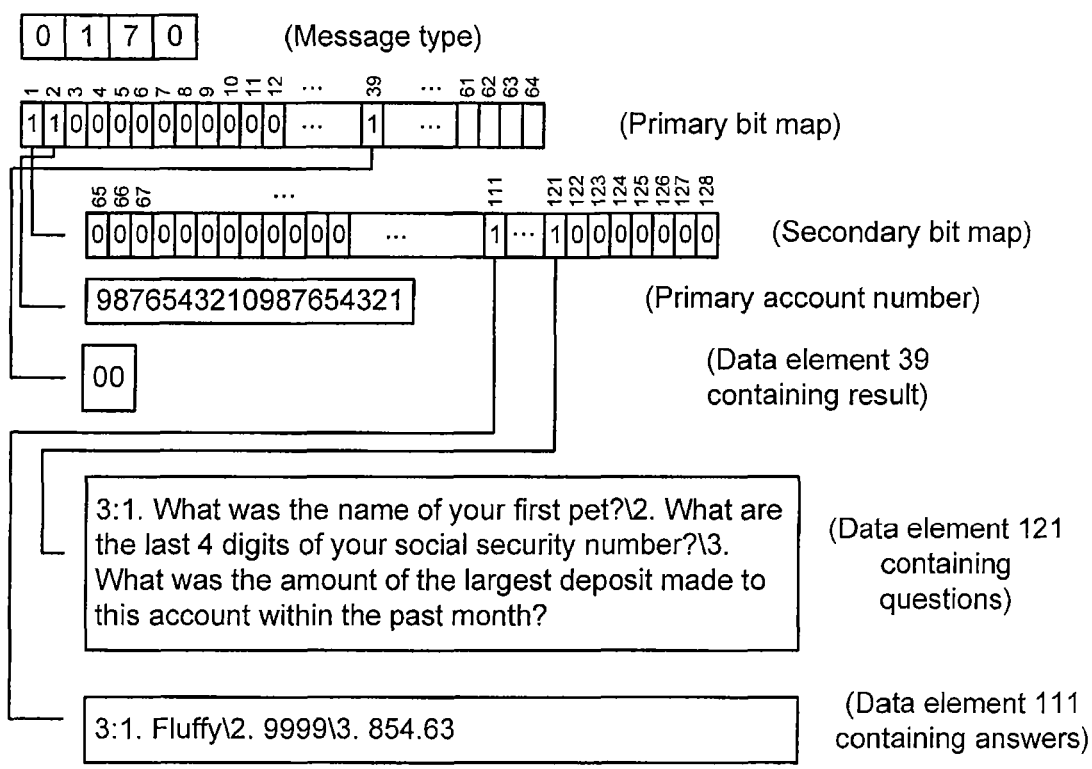
FIG. 20 shows a partial reply to the answer message of FIG. 19, in accordance with an example embodiment of the invention.

And finally, FIG. 20 shows a partial example reply to the answer message of FIG. 19. In this example, the message type is 170, indicating that this is a reply to an answer message. The question and answer data elements 121 and 111 have been left intact, and the approval message has been placed in data element 39. Data element 39 is commonly used for transaction approvals or other approvals, with a 2-character response code of "00" indicating approval. (Of course, other values may be used in this new message type.) Corresponding bit 39 in the primary bit map has been set to '1', indicating that data element 39 is present. While the example of FIG. 20 shows an approval code "00" indicating that the answers to the questions were acceptable and the applicant's account ownership is authenticated, a different code would be used if the answers were not sufficient to authenticate the applicant. Preferably, a failure response code would be used that is not used by other messages. For example, a response code of "QF" might be used to indicate that the answers to the questions were unsatisfactory. Many other response codes are possible, and other data elements could be used for indicating the result of the authentication attempt. For example, a response code could be placed in data element 105, another field that may be reserved for special use.

The example of FIGS. 16-20 is but one of many ways that these message types may be implemented. One of skill in the art will note that other formats may be used with other networks or other message standards.

The invention has now been described in detail for the purposes of clarity and understanding. However, those skilled in the art will appreciate that certain changes and modifications may be practiced within the scope of the appended claims.

What is claimed is:

1. A method of authenticating an applicant, the method performed by a computer executing a program stored on a computer readable medium, the method comprising:
 receiving an indication of an existing financial account purportedly owned by the applicant;
 transmitting a question request message to a purported issuer of the financial account that has stored at least one challenge question, the question request message identifying the account and requesting one or more questions relating to the account to be asked to the applicant, at least one of which asks for information about a detail of the account that changes over time;
 receiving from the issuer of the account a first reply in response to the question request message, the first reply comprising a set of the one or more questions;
 asking the applicant the set of one or more questions relating to the account;
 receiving answers to the questions from the applicant;
 transmitting an answer message to the issuer of the account, the answer message comprising the applicant's answers to the questions; and
 receiving a second reply from the issuer of the account in response to the answer message, the second reply indicating whether the applicant is authenticated as the owner of the account;
 and wherein the messages and replies are carried over an electronic funds transfer network.

2. The method of claim 1, wherein the first reply is supplied by an operator of the electronic funds transfer network.

3. The method of claim 1, wherein the at least one question is the amount of a most recent deposit into the account.

4. The method of claim 1, further comprising reformatting at least one of the questions before asking the applicant the questions.

5. The method of claim 1, wherein interaction with the applicant is accomplished through a series of web pages served over the Internet.

6. The method of claim 1, wherein interaction with the applicant is accomplished via telephone or at least in part via wireless communication.

7. The method of claim 1, wherein the method is performed by an acquirer, and wherein the acquirer does not learn the content of the answer message.

8. The method of claim 1, further comprising encrypting the content of the answer message before sending it over the electronic funds transfer network.

9. The method of claim 1, wherein the method is performed by an acquirer, and wherein the applicant is an applicant for enrollment in a service offered by the acquirer.

10. A method of authenticating an applicant, the method performed by a computer executing a program stored on a computer readable medium, comprising:
   receiving at a financial institution a question request message, the question request message identifying an existing account of the financial institution and requesting a set of one or more questions relating to the account to be asked of the applicant;
   transmitting a reply to the question request message, the reply to the question request message comprising the set of one or more questions, at least one of which asks for information about a detail of the account that changes over time;
   receiving an answer message, the answer message comprising a set of answers given by an applicant to the set of one or more questions relating to the account;
   comparing the answers with known information relating to the account;
   deciding, based on the comparison, whether the applicant is authenticated as the account owner; and
   transmitting a reply in response to the answer message, the reply to the answer message indicating whether the applicant is authenticated;
   wherein the messages and replies are carried over an electronic funds transfer network.

11. The method of claim 10, further comprising selecting the one or more questions from a set of standard questions defined by an operator of the electronic funds transfer network.

12. The method of claim 11, further comprising supplying in advance, by an issuer of the account to an operator of the electronic funds transfer network, a list of challenge questions, and wherein the operator supplies the first reply comprising one or more questions from the list.

13. The method of claim 10, wherein at least one of the questions tests the applicant's knowledge of secret information previously shared between the issuer and the holder of the account.

14. The method of claim 10, wherein at least one of the questions tests the applicant's knowledge of a transaction history of the account.

15. The method of claim 14, wherein at least one of the questions tests the applicant's knowledge of one or more patterns or anomalies in the transaction history of the account.

16. The method of claim 10, wherein at least one of the questions tests the applicant's knowledge of a card associated with the account.

17. The method of claim 10, wherein at least one of the questions is formed such that the correct answer to the question changes over time.

18. The method of claim 10, wherein at least one of the questions tests the applicant's knowledge of an object or piece of information provided by the issuer to the account holder for the purpose of later authentication.

19. The method of claim 10, wherein at least one of the questions is a multiple choice question.

20. The method of claim 10, wherein the first reply comprises formatting guidance for use in presenting the questions to the applicant.

21. The method of claim 10, wherein deciding, based on the comparison, whether the applicant is authenticated as the account owner further comprises deciding that the applicant is authenticated when the comparison indicates that the applicant supplied a first predetermined number of correct answers to a second predetermined number of questions.

22. A system for authenticating an applicant, the system comprising:
   a host computer executing a program stored on a computer readable medium, the host computer configured to
   receive an indication of an account purportedly owned by the applicant;
   transmit, over an electronic funds transfer network and to a purported issuer of the financial account that has stored at least one challenge question, a question request message, the question request message identifying the account and requesting a set of one or more questions about the account to be asked to the applicant;
   receive from the issuer of the account, over the electronic funds transfer network, a first reply in response to the question request message, the first reply comprising the set of one or more questions, at least one of which asks for information about a detail of the account that changes over time;
   ask the applicant the questions;
   receive, from the applicant, answers to the questions;
   transmit, over the electronic funds transfer network, an answer message to the issuer of the account, the answer message comprising the applicant's answers to the questions; and
   receive, over the electronic funds transfer network, a second reply from the issuer of the account in response to the answer message, the second reply indicating whether the applicant is authenticated as the owner of the account.

23. The system of claim 22, wherein the host computer is configured to interact with the applicant via a series of web pages served over the Internet.

24. A system for authenticating an applicant, the system comprising:
   a host computer of a financial institution, the host computer executing a program stored on a computer readable medium, the host computer configured to
   receive from an acquirer or service provider, over an electronic funds transfer network, a question request message, the question request message identifying an account of the financial institution and requesting one or more questions relating to the account to be asked of the applicant;
   transmit to the acquirer or service provider, over the electronic funds transfer network in response to the question request message a first reply, the first reply comprising the one or more questions, at least one of which asks for information about a detail of the account that changes over time;

receive, over the electronic funds transfer network, an answer message, the answer message comprising a set of answers given by the applicant to the questions;

compare the answers with known information relating to the account;

decide, based on the comparison, whether the applicant is authenticated as the account owner; and transmit to the acquirer or service provider, over the electronic funds transfer network, a second reply in response to the answer message, the second reply indicating whether the applicant is authenticated.

25. A method comprising adding, to a set of messages handled by an electronic funds transfer network, two messages and their associated replies, wherein:

the first message is generated by a computer system of an acquirer or service provider and is transmitted to a computer system of an issuer financial institution having an account for which authentication is being sough, wherein the first message requests a set of questions to be asked of an applicant for authentication of the account;

the reply to the first message comprises a set of questions to ask the applicant that was received from the computer system of the issuer financial institution, at least one of which asks for information about a detail of the account that changes over time;

the second message is generated by the computer system of the acquirer or the service provider and communicates the applicant's answers to the computer system of the issuer financial institution; and the reply to the second message is generated by the computer system of the operator of the issuer financial institution and communicates an indication of whether the applicant is authenticated.

26. The method of claim 25, wherein the questions and answers are carried in existing data elements in a message format based at least in part on the ISO 8583 standard.

* * * * *